United States Patent
Fogle (10) Patent No.: US 7,000,324 B2
(45) Date of Patent: Feb. 21, 2006

(54) TOP LOADING FIXED LINE TRIMMER HEAD

(75) Inventor: John R. Fogle, Cave Creek, AZ (US)

(73) Assignee: Robert L. Phillips, Scottsdale, AZ (US), part interest ( * ) Notice: Subject to any disclaimer, the term of this patent is extended or adjusted under 35 U.S.C. 154(b) by 18 days.

(21) Appl. No.: 10/617,899

(22) Filed: Jul. 11, 2003

(65) Prior Publication Data

US 2004/0103543 A1     Jun. 3, 2004

Related U.S. Application Data

(63) Continuation of application No. 09/738,678, filed on Dec. 15, 2000, now abandoned.

(51) Int. Cl.
    *A01D 34/84*    (2006.01)
(52) U.S. Cl. .......................................... 30/276; 30/347
(58) Field of Classification Search .................. 30/276, 30/347, 295; 56/12.7
    See application file for complete search history.

(56) References Cited

U.S. PATENT DOCUMENTS

| | | | |
|---|---|---|---|
| 4,411,069 A | 10/1983 | Close | |
| 5,020,224 A | 6/1991 | Haupt | |
| 5,493,785 A | 2/1996 | Lawrence | |
| 5,566,455 A | 10/1996 | Hagstrom | |
| 5,675,897 A | 10/1997 | Berfield | |
| 5,901,448 A | 5/1999 | Lingerfelt | |
| 5,979,064 A | 11/1999 | Kitz | |
| 6,035,511 A | 3/2000 | Wood | |
| 6,035,618 A | 3/2000 | Fogle | |
| 6,108,914 A | 8/2000 | Sheldon | |
| 6,148,523 A | 11/2000 | Everts | |
| 6,349,475 B1 | 2/2002 | Buck | |
| 2002/0073556 A1 | 6/2002 | Fogle | |

*Primary Examiner*—Allan N. Shoap
*Assistant Examiner*—Omar Flores Sánchez
(74) *Attorney, Agent, or Firm*—LaValle D. Ptak (57) ABSTRACT

A fixed line top-loading trimmer head for string trimmer machines, uses line segments of a predetermined length. The head has a central hub designed for attachment to the drive shaft of a string trimmer machine. A circular flange is attached to, and extends outwardly from, the central hub. This circular flange has one or more trimmer line exit openings on the circumference. The hub, located above the upper surface of the circular flange, is provided with either line termination apertures in the form of holes or channels which are angularly offset from the exit openings in the circular flange; or it is provided with an offset guide channel through which a trimmer line is passed between the exit openings. A line guide channel is located in the flange between the line exit openings and the line termination apertures, or the offset channel on the hub, for guiding line between the exit openings and the offset channel or termination apertures.

4 Claims, 7 Drawing Sheets

TOP LOADING FIXED LINE TRIMMER HEAD

This application is a continuation of application Ser. No. 09/738,678 filed Dec. 15, 2000 now abandoned.

BACKGROUND

Weed and grass trimmers have been developed which employ a rotatable hub, with a short length of flexible nylon or other plastic line extending from the hub. When the hub is rotated (typically, at speeds from 6,000 RPM to 12,000 RPM), the tip of the line extending from the hub provides the cutting or trimming action. Weed and grass trimmers using this principle of operation have become popular for their versatility of use, and because the flexible trim line is safer to use than rigid rotating steel blades.

Various types of devices have been developed for using such trimmer lines. Typically, rotating line trimmers or rotating string trimmers employ a line which generally has a circular cross section. In many hand-held trimmers, the line is wound on a storage reel in the hub of the device, and is fed out of a hole in the hub in discrete amounts, as the end wears off or breaks off. Trimmers of this type sometimes are referred to as "bump-and-feed" trimmers, since, when the line breaks off, the bottom of the storage reel is bumped on the ground to cause a spring release of the line within the trimmer. A short length of line then is played out through a hole in the hub by means of centrifugal force when the trimmer is operating. Typically, bump-and-feed string trimmers use relatively small diameter line, normally in the range of 0.065" to 0.080" diameter, since the smaller diameter flexible line functions better for the centrifugal feeding of a bump-and-feed head.

Generally, heavier diameter line (for example, 0.115" to 0.160") is too stiff for winding and for the centrifugal feeding used in bump-and-feed heads. An advantage of bump-and-feed heads is that less frequent reloading of the line, theoretically, is required than for trimmers using short segments of a predetermined length.

A problem exists, however, with bump-and-feed trimmers in that frequently the line which is wound tends to become stuck, either due to partial fusion of the line within the hub, caused by high frequency vibration, or by successive turns of the line wound on the hub becoming somewhat entangled. As a result, feeding of the line from the hub, when desired, does not always take place. When this occurs, it is necessary to remove the hub from the string trimmer device and manually extract the desired length of line, prior to re-attaching the hub to the device. This is a time consuming and frustrating experience for many users of flexible line string trimmers.

For commercial use, employing relatively large diameter lines, for example 0.115" to 0.160" diameter, fixed length line or cut line trimmer heads usually are employed. The large diameter monofilament nylon lines are particularly useful where weed and grass growth is dense. The large diameter lines also provide longer length of service before the line needs to be replaced. A type of heavy duty machine which has been designed for commercial use is a high-wheeled machine, where the motor and operating mechanism is carried between a pair of wheels. The trimmer head extends forward of the wheels, and then downwardly toward the ground, where relatively large diameter fixed or cut lengths of line are inserted into the trimmer head for effecting the trimming operation.

In most cases, either for standard hand-held gas or electric trimmers, or for high-wheeled commercial brush trimmers, when line is to be reloaded, the unit is at rest with the head facing upward. Most trimmers require bottom or side loading. This requires the machine to be tilted upwardly. This is awkward and the machine is heavy to hold. In addition, because of the inverted position of the machine, the possibility of gasoline spillage is ever present.

Bottom loading machines also preclude the utilization of replaceable ground spacers of different heights, since such ground spacers need to be attached to the underside of the head. Another disadvantage, particularly with commercial machines, is that the heavy duty line which is used is difficult to bend and load into the machines. A popular machine employs three closely arrayed semi-circular loops secured to the face of the trimmer head, near its perimeter. To replace line, it must be passed through the three loops in a generally knotted configuration to extend both ends of a fixed cut length of line outwardly from the same side of the head. The sharp bends which are required for insertion of the line make both insertion of a new line and removal of a depleted line difficult, particularly when the larger sizes of line mentioned above are used with such a machine.

The United States patent to Fogle 6,035,618 is directed to a fixed line trimmer head for overcoming the disadvantages present in conventional bump-and-feed heads, and also for permitting use of lines of different diameters in the same trimmer head. The Fogle head, however, requires loading and replacement of the line from the bottom or underside of the head, thus causing it to be subject to the disadvantage of awkward bottom loading, for the reasons discussed above.

It is desirable to provide an improved fixed length line trimmer head for string trimmer machines, which overcomes the disadvantages of the prior art, which may be loaded from the top, which is capable of utilization with lines of different diameters, and which securely holds fixed segments of line in place during use.

SUMMARY OF THE INVENTION

It is an object of this invention to provide an improved trimmer head for string trimmer machines.

It is another object of this invention to provide an improved fixed line trimmer head for string machines.

It is an additional object of this invention to provide an improved fixed line trimmer head for string trimmer machines in which the line is simple to install and replace.

It is yet another object of this invention to provide an improved fixed line trimmer head for string trimmer machines capable of use with lines of different diameters.

It is a further object of this invention to provide a top loading fixed line trimmer head for string trimmer machines which is easy to load with trimmer lines, and which employs locations of line exit openings and line termination apertures designed to firmly hold the line in place during use, and to facilitate rapid removal of line which is to be replaced.

In accordance with a preferred embodiment of the invention, a top loading fixed line trimmer head for string trimmer machines employs a central cylindrical hub having an upper end for attachment to a drive shaft of a string trimmer machine, and having a lower end. A circular flange is attached to, and extends outwardly from, the lower end of the central hub. The circular flange has trimmer line exit openings on the circumference thereof. A line guide channel is located between the line exit openings in the circular flange and openings on the upper surface of the flange to guide line to line termination apertures or grooves located on either the hub or the flange, and angularly offset from the trimmer line exit openings, to securely hold a segment of line in place.

DETAILED DESCRIPTION

Reference now should be made to the drawings, in which the same reference numbers are used throughout the different figures to designate the same or similar components. FIGS. 1 through 4 are directed to a preferred embodiment of the invention as applied to a top-loading, fixed length line trimmer head for a string trimmer machine. The trimmer head which is illustrated in FIGS. 1 through 4 may be used in conjunction with either a hand-held trimmer or a high-wheeled brush trimmer. The principles of operation of the head are identical in either application.

In the embodiment shown in FIGS. 1 through 4, the trimmer head itself comprises an upward extending central cylindrical hub terminating at its lower end in a circular flange 20. The hub itself has a central aperture 32 located in it for receiving a bolt 36 (FIG. 2), which is threaded upwardly through the opening 32 to attach the trimmer head to the drive shaft mechanism of a hand held trimmer or a high wheeled trimmer. Connection of the trimmer head 20 with the drive mechanism of the string trimmer machine with which it is used may be effected in any suitable manner; and the illustration of the bolt 36 merely is indicative of one such means of connection. Other standard techniques for connecting the hub of the trimmer head to the drive mechanism of the trimmer machine may be used, as well as the one which is specifically shown in FIG. 2.

Figure 1:
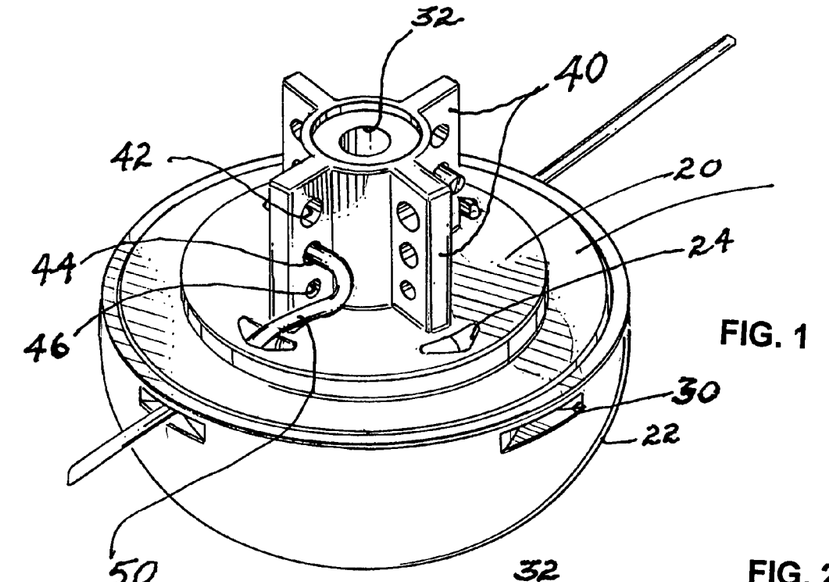
FIG. 1 is a top perspective view of a preferred embodiment of the invention.
Figure 2:
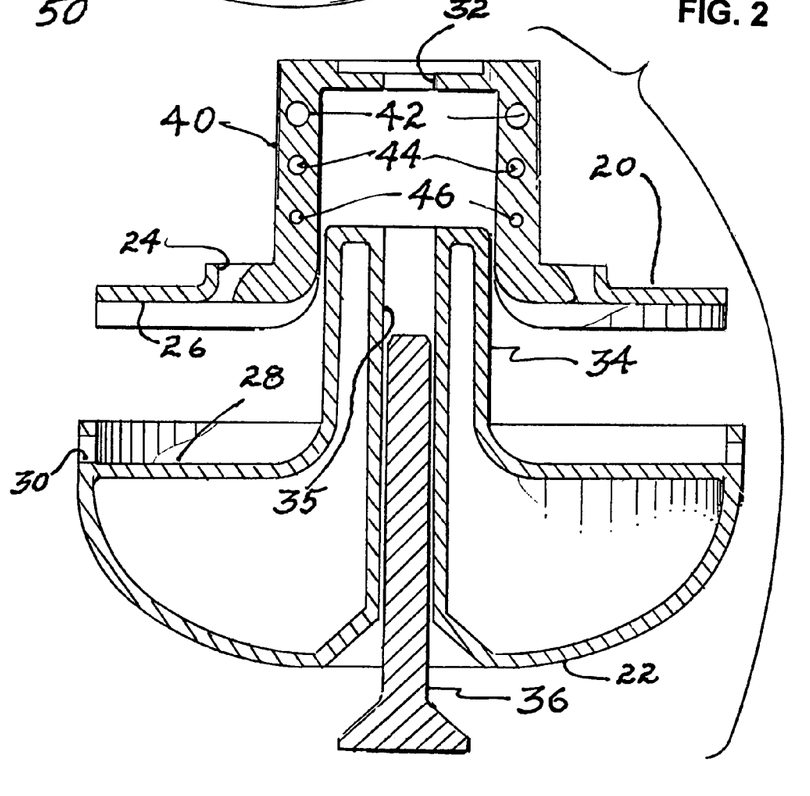
FIG. 2 is a cross-sectional view of the embodiment shown in FIG. 1.

In the embodiment shown in FIGS. 1 through 4, the upper head portion, consisting of the central hub and the circular flange 20, preferably is made of metal; and the bolt 36 is used to attach a domed spacer 22 to the bottom of the metal head portion, simultaneously with the connection of the assembly by means of the bolt 36 to the drive mechanism of the string trimmer machine. This is most readily evident from an examination of the partially exploded view of FIG. 2 showing the parts prior to their complete assembly. When the parts are completely assembled they assume the configuration shown in FIG. 1, with an outer lip of the domed spacer 22 extending around the periphery of the edge of the circular flange 20 of the hub portion. This protects the metal flange 20 from abrasive wear in the event the assembled trimmer head strikes posts, walls, rocks or the like during operation. Instead, such wear takes place on the plastic domed spacer 22, which may be readily replaced, if it is damaged or broken. It also should be noted that the spacer 22 may assume configurations having greater or lesser depth than the one shown in FIG. 2; so that the trimmer head may be adapted to spacing the ends of the cutting lines at different distances above the ground, in accordance with the configuration of the spacer 22.

Whether the spacer 22 has the relative dimensions shown in FIG. 2 or is shallower or deeper than the one shown in FIG. 2, it includes, on its upper surface channels 28 and flared exit openings 30. The channels 28 mate with corresponding undercut channels 26 in the circular flange 20 of the head. When the parts are fully assembled to cause the upper end of the cylindrical hub 34 of the spacer 22 to engage the lower side of the top of the hub adjacent the hole 32, the undercut channels 26 in the circular flange mate with the open channels 28 in the spacer to provide generally circular channels for guiding and accommodating string trimmer line.

In contrast to the conventional manner of utilizing fixed lengths of string trimmer line, or in bump-and-feed string trimmers, the trimmer line 50 used in conjunction with the head shown in FIGS. 1 through 4 comprises short lengths which terminate at one end in one of four upstanding longitudinal flanges 40, which preferably are perpendicular to the upper surface of the circular flange 20. This is shown most clearly in FIGS. 1,2 and 4.

Figure 3:
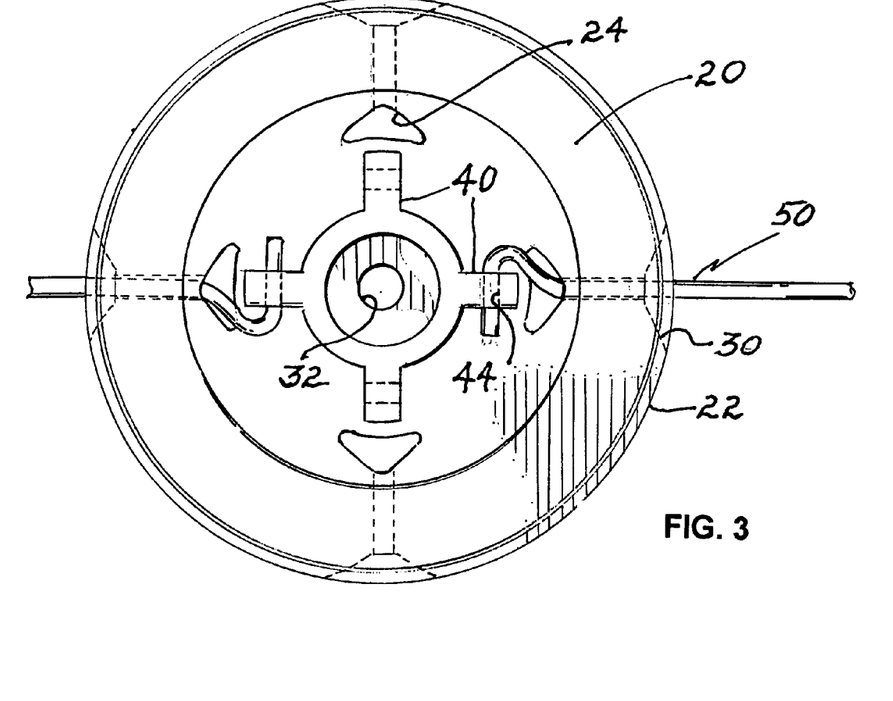
FIG. 3 is a top view of the embodiment shown in FIG. 1.
Figure 4:
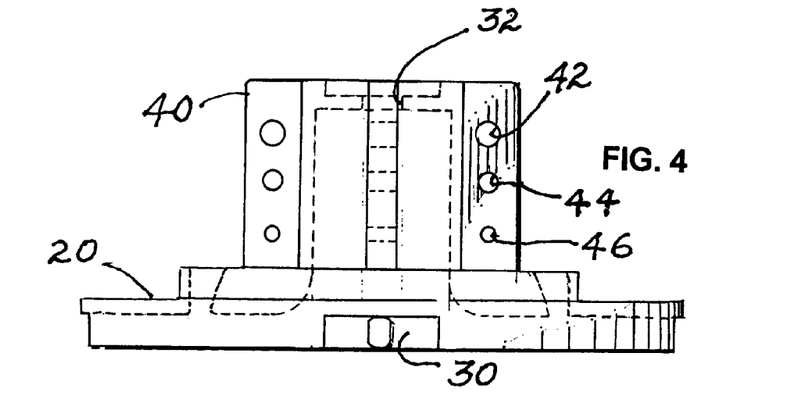
FIG. 4 is a side view of a portion of the embodiment shown in FIG. 1.

As indicated in FIGS. 1 through 4, four flanges 40 are provided, spaced at intervals around the circular central hub of the metal head portion. The flanges 40 extend parallel to the central axis of the hub, and each of them includes three different sized holes 42, 44 and 46, spaced along the length of the flange, as shown most clearly in FIGS. 2 and 4. As is readily apparent from an examination of FIGS. 2 and 4, holes 42 are the largest, the holes 44 are intermediate in size, and the holes 46 are the smallest. These holes are sized to accommodate string trimmer lines of three different external diameter ranges. The smallest hole 46, for example, may be employed to accommodate the insertion of relatively small diameter trimmer line (on the order of 0.065" to 0.080" diameter). The hole 46 is selected to be just slightly larger than the larger of these two small diameters. For heavier line, the holes 44 are designed to allow the insertion of mid-sized diameter lines; and the holes 42 are dimensioned to allow the insertion of the largest diameter line, typically 0.160" in diameter. This allows the head to be used in a machine with the diameter of line chosen for the particular application with which the machine is used at any particular time. Once the proper diameter has been selected, the end of the line is inserted through the appropriate one of the openings 42, 44 or 46, as shown most clearly in FIGS. 1 and 3. The opposite or free end, which will be the cutting end, is inserted downwardly through a guide channel 24 formed through the top of the circular flange 20 to open into the channel between the portions 26 and 28 to permit the line 50 then to extend outwardly through the flared opening 30, as shown in FIGS. 1 and 3.

In the embodiment shown in FIGS. 1 through 4, anywhere from one to four line segments 50, attached as shown in FIGS. 1 and 3 may be utilized. It is readily apparent that the replacement of a worn line 50 is quickly and easily effected for all diameters, from the smallest to the largest. It is a relatively simple matter to insert one end of the line first into the transverse holes (42., 44 or 46) through the flanges 40, as described, and then push the other end of the line 50 downwardly through the openings 24, and then outwardly through the flared exit openings 30.

It should be noted that the flared exit openings 30 through the plastic spacer 22 may have a metal ferrule in them to reduce the chances of plastic fusion between the line and the edges of the openings 30 due to high frequency vibrations. The spacer 22 may be made of a hard plastic material, but it also could be made of metal, if desired. For most operations, the utilization of hard plastic for the portion 22 is preferred.

When a line segment 50 has become shortened through wear or breakage, so that it needs to be discarded, it is a simple matter to remove the unused portion by reversing the steps quoted above, or simply pulling the line at the bight where it is inserted into the hole 42/44/46, and then pulling it out of the guide opening 24.

Initially, it would appear that a trimmer line 50 inserted into the head, as described above, would not be firmly held in place. It has been found, however, that when centrifugal force on the line 50 causes it to draw outwardly, particularly when it strikes various objects in operation of the head, a tight pull in the outward direction from the exit openings 30 causes the bight or bend in the line, at the place where it is inserted through the holes 42, 44 or 46 (oriented substantially 90° to the path of the line through the channel 26/28 and out of the opening 30) causes increased friction between the edge of the hole and the line to prevent pulling the line 50 out of the holes 42/44/46. In fact, the greater the pull, the tighter is the hold of the line in the holes 42/44/46. Outward pulling force applied to the line 50 typically will break the line somewhere along its length before the line can be pulled out of the hole 42/44/46, once it is inserted into the proper sized hole, as described above. By offsetting the direction of the axis of the holes 42/44/46 from the generally radial direction of the exit of the line 50 from the head, the excellent holding force described above is obtained. Clearly, the ears or flanges 40 do not need to be perpendicular to the plate 20 or oriented parallel to the longitudinal axis of the hub of the metal portion 20 of the head. The flanges 40 may be oriented at some other angle. The operation would be the same as described above for the embodiment specifically shown in FIGS. 1 through 4.

Figures 5, 5A, 5B, 5C, 5D:
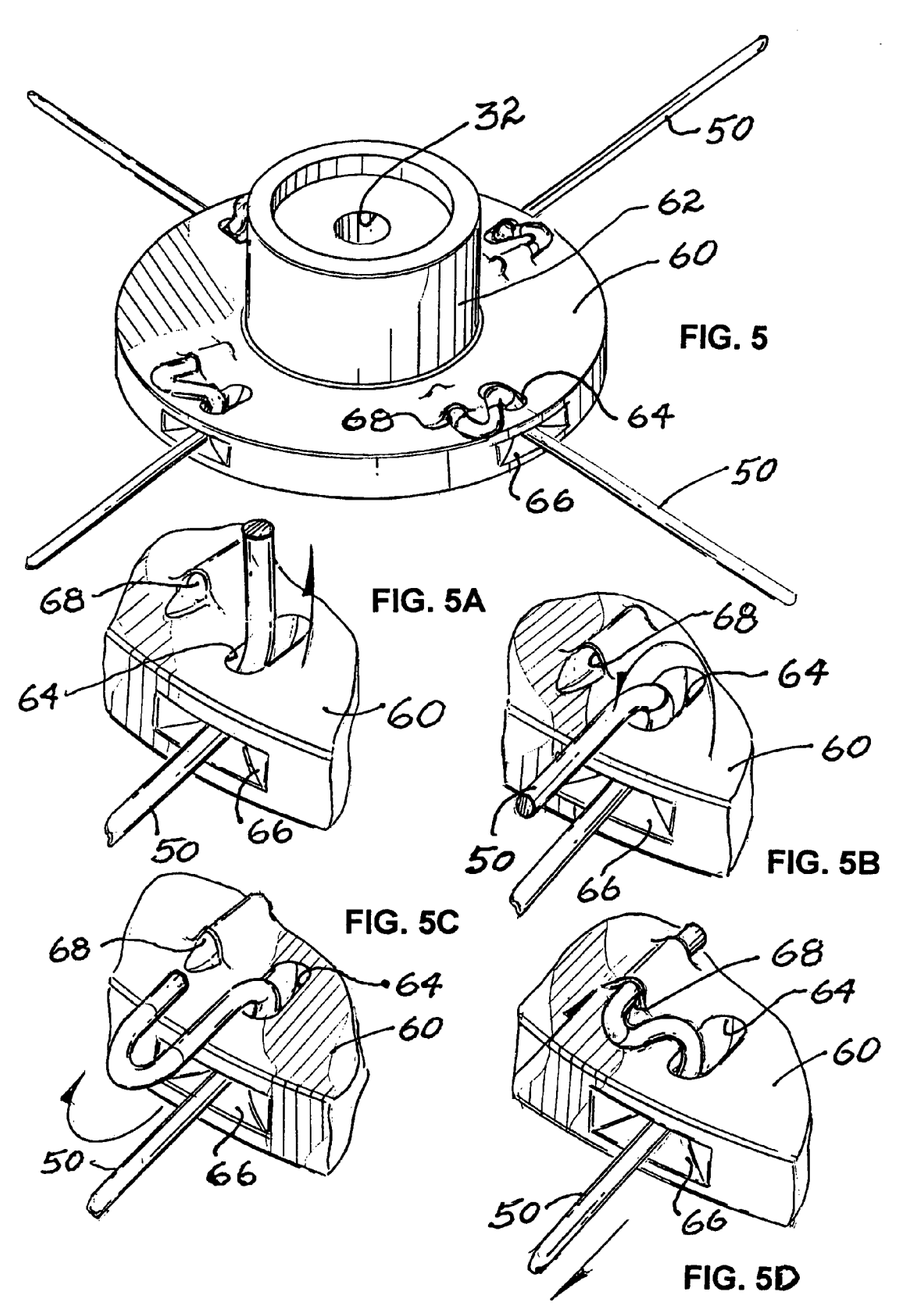
FIG. 5 is a top perspective view of another embodiment of the invention.
FIGS. 5A through 5D illustrate operating features of the embodiment shown in FIG. 5.

FIG. 5 illustrates a variation of the embodiment shown in FIGS. 1 through 4. In FIG. 5, the upper metal portion of the head is shown with a hub 62 and a lower circular flange 60, which is comparable to the construction of the upper portion of the head of FIGS. 1 through 4. The head 60/62 has a circular aperture opening 32 in it for attachment of a spacer plate 22 and a bolt 36 in the same manner as described previously in conjunction with FIGS. 1 through 4. In the embodiment shown in FIG. 5, however, no flanges or ears 40 are placed on the outer periphery of the hub 62. Instead, there is a termination hole or short channel 68 placed adjacent each of the channels 64 in the top of the plate 60. The channels 64 correspond to the channels 24 in the top of the plate 20.

Reference should be made now to FIGS. 5A through 5D for the manner in which the line 50 is inserted, terminated and held in place in the embodiment of FIG. 5. As shown in FIG. 5A, the terminating end of the line 50 is inserted through a flared exit opening 66 and extends upwardly and out of the channel opening 64, which cooperates with an internal channel in the plate 20. This internal channel may be formed in any suitable manner, including the manner in which the channel 26/28 is formed in the embodiment of FIGS. 1 through 4.

Once the line is inserted as shown in FIG. 5A, it then is pulled outwardly a short distance, as shown in FIG. 5B. After a sufficient length of the line has been pulled outwardly, it then is turned as shown in FIG. 5C, and inserted into the hole or channel 68 formed adjacent the opening 64. This places a generally "S-shaped" curvature in the line. Again, as with the embodiment of FIGS. 1 through 4, if extensive force is placed on the line in the direction of the lower arrow shown in FIG. 5D, it tightly pulls into place against the edge of the channel 68 to resist any removal of the line by pulling it in that manner. To remove the line, the line is pushed inwardly, as shown in FIG. 5A, to loosen the bight in the line; and then the end which is inserted into the channel 68 easily may be pulled out with the fingers. The operation of the embodiment of FIG. 5, however, is identical to that of the embodiment shown in FIGS. 1 through 4.

Again, in the embodiment of FIG. 5, segments of line are "end terminated" and then extend outwardly through the flared outlet channels 66 in the same manner line extends from the channels 30 in the embodiment of FIGS. 1 through 4. The head of FIG. 5 may be used with or without the spacer 22. It also should be noted that if no spacer 22 is desired with the head of FIGS. 1 through 4, a different channel arrangement on the underside of the circular plate 20 may be employed to guide the line outwardly through the exit openings 66 shown in FIG. 5.

Figures 6, 7, 8:
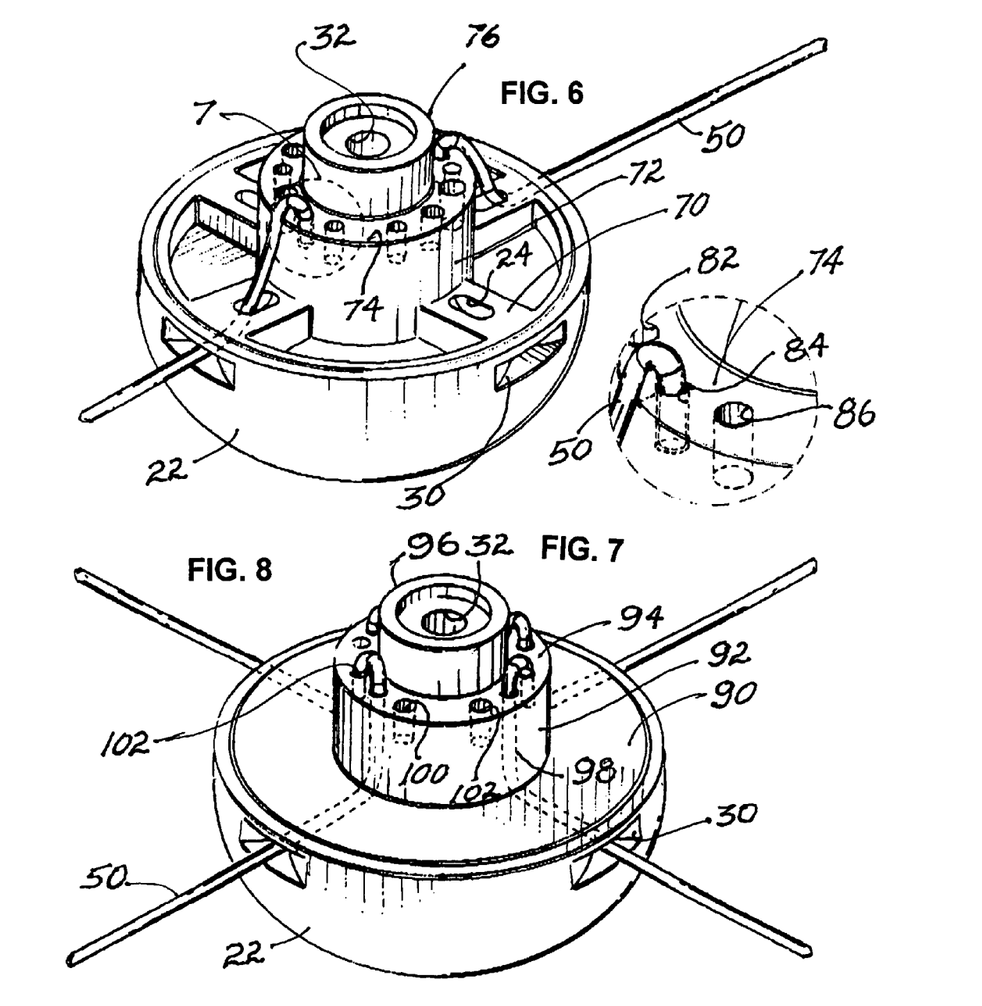
FIG. 6 is a top perspective view of another embodiment of the invention.
FIG. 7 is a detail of the portion marked "7" in FIG. 6.
FIG. 8 is a top perspective view of another embodiment of the invention.

FIGS. 6, 7 and 8 are directed to another alternative embodiment of the invention described in conjunction with FIGS. 1 through 5. Again, many of the elements of the head of FIGS. 6, 7 and 8 are similar to those described previously; so that a detailed description of those common elements is not considered necessary here. FIG. 6 shows the upper metal portion of the head being made in the form of a spoked wheel, with spokes 70 attached to a central hub 76, rather than in the form of a solid circular disk, as shown in FIGS. 1 and 5. It should be noted that the embodiments of FIGS. 1 and 5 also could use spoked wheels, instead of solid circular disks, without changing the other functions of those embodiments.

In the embodiment shown in FIG. 6, each of the spokes 70 of the wheel has a flared outlet or exit opening 30 cooperating with an inner channel (not shown in these figures), which opens into a top opening 24 in each of the four spokes 70. The hub 76 has a widened shoulder 74 on it, with a plurality of short holes 82/84/86 (FIG. 7) formed in it.

The holes 82/84/86 serve the same function and purpose as the holes 42/44/46 of the embodiment of FIGS. 1 through 4. Instead of passing all the way through the widened shoulder 74 on the hub 76, however, the holes extend part way a sufficient distance to allow the end of the trimmer line 50 to be inserted into the appropriately sized hole in the manner shown in FIGS. 6 and 7. The line is held in place in the same manner described above for the embodiments of FIGS. 1 through 5 by virtue of the sharp bend at an angle to the general direction of the exit of the line 50 from the exit openings 30, as shown in FIGS. 6, 7 and 8.

It also should be noted that anywhere from one to four lines may be used with the embodiments of FIGS. 6 and 8. Greater numbers of line segments 50 may be employed; although typically, string trimmer machines do not use more than four. Generally, such machines use either two or four lines; but any number of lines can be employed. The utilization of diametrically opposite or symmetrically disposed lines produces lower vibration of the rotating head; but odd or even numbers of lines may be employed as desired.

In the embodiment of FIG. 8, a different configuration from that shown in FIG. 6, but using the same general operating principles, is indicated. In the embodiment of FIG. 8, the spacer plate 22 is used to form a channel on the bottom of the circular flange 90 to accommodate a line passing upwardly through the shoulder portion 94 (similar to the shoulder 74 in the embodiment of FIG. 6). The line then is turned and pushed downwardly into an adjacent hole on one or the other side of the channel 98, through which it passes. In utilizing the embodiment shown in FIG. 8, however, typically only two different line size ranges are employed, instead of the three different ones which are possible with the embodiments of FIGS. 1, 5 and 6, for example. The operating principles, however, are the same; and the embodiment of FIG. 8 is similar to the one of FIG. 6, both in structure and in operation. Again, the holes 82/84/86 or 100/102 of the embodiments of FIGS. 6 and 8 are oriented at an inclined angle to the exit direction of the line 50 through the exit openings 30 to ensure a tight pulling and holding of the line in place during operation of the trimmer head.

Figure 9:
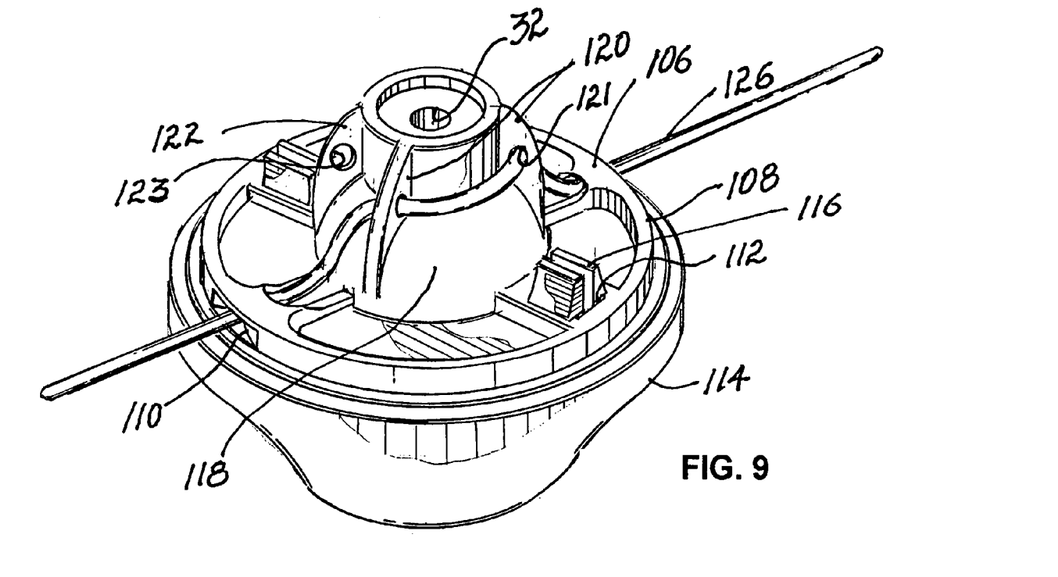
FIG. 9 is a top perspective view of another embodiment of the invention.
Figure 10:
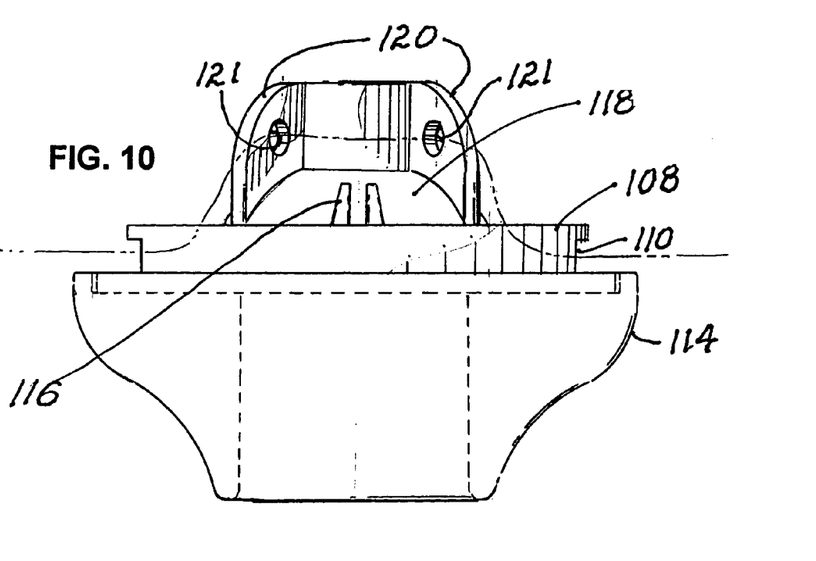
FIG. 10 is a side view of the embodiment of the invention shown in FIG. 9.
Figure 11:
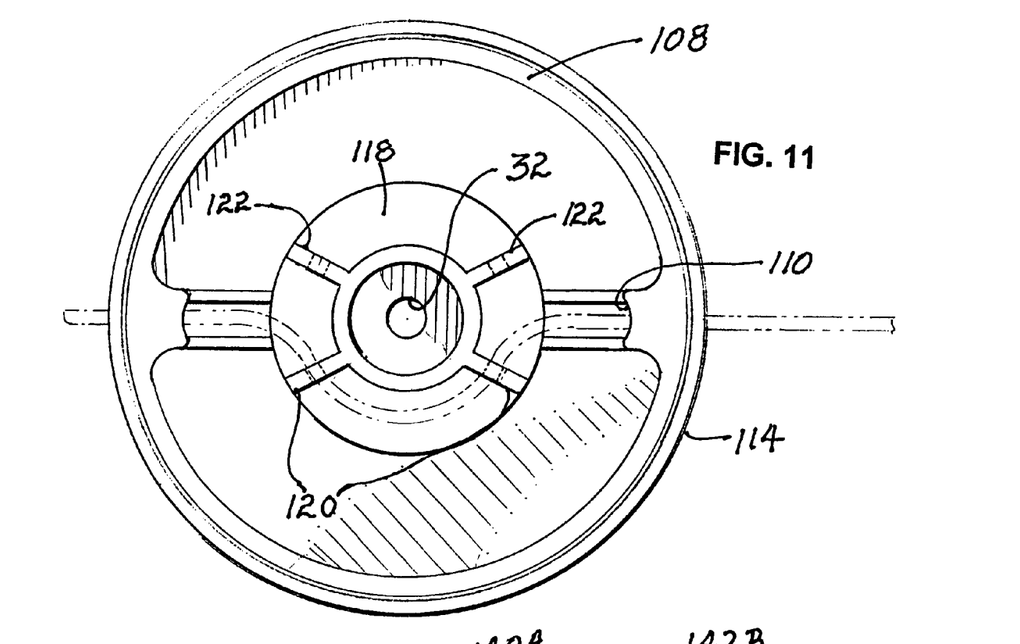
FIG. 11 is a top view of the embodiment shown in FIG. 9.

FIGS. 9, 10 and 11 are perspective side and top views, respectively, of another embodiment of the invention where a single length of cut line is extended through the trimmer head from one side to another, to extend on diametrically opposite sides of the head. In the embodiment of these figures, the general configuration of the utilization of a central hub 118 and a spoked wheel 108, with spokes 106 in it, is similar to the configuration of FIG. 6.

A replaceable spacer 114 is attached to the bottom of the spoked wheel 108 by means of flexible snap extension or spring extensions 116, which extend upwardly through corresponding apertures 112 in diametrically opposed ones of the spokes 106 in the head which is illustrated. The spacer 114 may be replaced with spacers of greater or lesser depths, as described above in conjunction with the spacer 22. By utilizing a connection of the spacer 114 through the spring clips 116 extending from it, the bolt 36 (FIG. 2), which extends upwardly through the bottom of the spacer 114, secures only the upper portion 108/106/118 to the machine drive shaft. Or, a connection to the opening 32 from the drive shaft of the string trimmer machine may be effected in some other manner, from the top. The manner in which the trimmer head is attached to the machine is not important to an understanding of the invention; but it is desirable to show that various configurations may be used while employing the same principles. It should be noted that the manner of connecting the spacer 114, as shown in FIGS. 9, 10 and 11, could also be used in conjunction with the embodiments of FIGS. 1 through 8, described previously.

In the embodiment shown in FIGS. 9, 10 and 11, two pairs of corresponding ears 120 and 122 are provided on opposite sides of the central hub 118. These ears have holes 121 through them (for the ears 120) and 123 through them (for the ears 122) The holes 121 are smaller than the holes 123; so that when a range of smaller diameter line is employed with the head, it is threaded through holes 121 in the manner shown in FIG. 9 from one exit opening 110, on one side of the head, to an opening 110 on another part of the head (most clearly shown in FIG. 9). Thus, a single cut length of line 126 extends through the entire head, rather than separate lengths of line which have an end terminated in the head, as shown in the embodiments of FIGS. 1 through 8.

The orientation of the ears 120 and the holes 121 through them, or the ears 122 and the holes 123 through them, is such that the same operating principles described above in conjunction with FIGS. 1 through 8 apply. When an outward centrifugal pulling force is placed on the line 126, in either direction, pulling outwardly from one or the other of the flared openings 110 on opposite sides, the snake-like path which is taken by the line 126 through the holes 121 or 123, causes the bend of the line 126 at the holes, as the line attempts to wrap around or straighten around the hub 118, to tighten and firmly grip the line, preventing it from being withdrawn in this manner. The embodiment of FIGS. 9, 10 and 11 is capable of use with line sizes in two or more general ranges (small or large).

Figure 12:
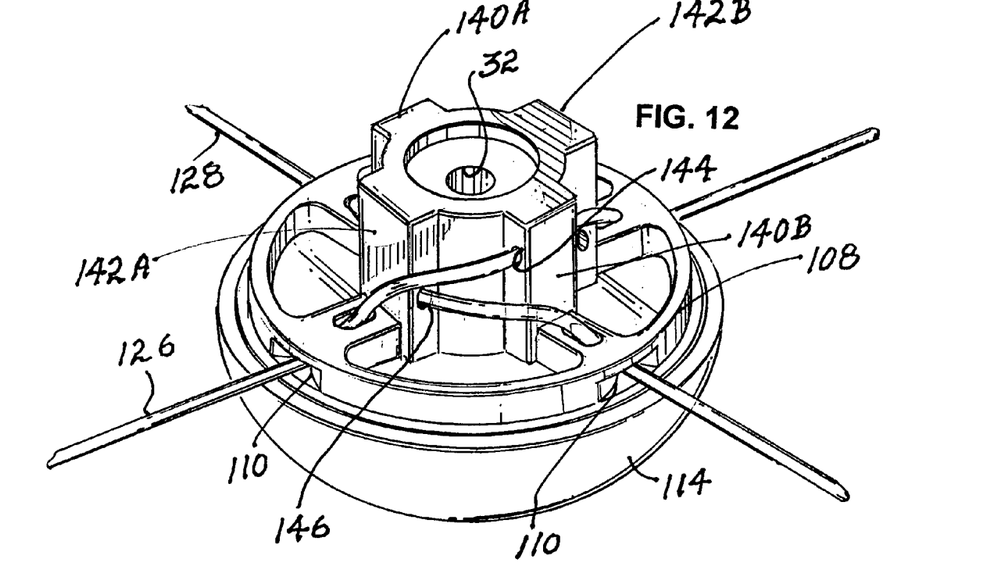
FIG. 12 is a top perspective view of a variation of the embodiment shown in FIG. 9.

FIG. 12 illustrates a variation of the embodiment shown in FIGS. 9, 10 and 11. In FIG. 12, in place of two sets of ears, such as 120 or 122 in the embodiment of FIGS. 9 through 11, a somewhat larger block set, such as 140A, 140B, or 142A, 142B, is employed. In the embodiment of FIG. 12, it also is possible to have line extending from four different angularly oriented positions on the head in the manner disclosed in conjunction with FIGS. 1 through 8. A hole (or holes) is provided through each of the blocks 140A, 140B, 142A and 142B. The blocks 140B and 142B each may be configured with a smaller diameter hole, such as the holes 121 described above in conjunction with the embodiment of FIGS. 9 through 11. Similarly, the blocks 140A and 142A are drilled or formed with a larger diameter hole 146 to accommodate larger diameter line. Line 126 then is strung from one side of exit opening 110 through the appropriate hole 144 or 146 in the block which is positioned essentially half-way between the exit openings 110, in the manner illustrated in FIG. 12. Similarly, on the spokes of the wheel 108, which are shown oriented at 90° to the first set, a second line 128 is drawn and passed through the openings 146 or 144, in either the block 142A or 142B, which has an opening through it appropriate for the line size 128 being used. The orientation and the manner in which the line is placed in the head is the same as described above in conjunction with FIGS. 9 through 11. The operation is the same as in the embodiment of FIGS. 9, 10 and 11.

Figure 13:
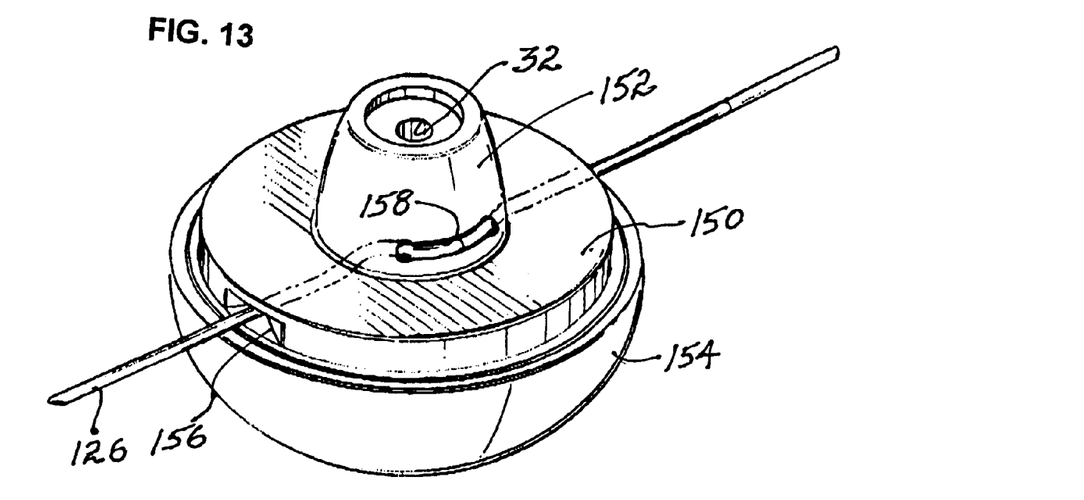
FIG. 13 is a top view of another embodiment of the invention.
Figure 14:
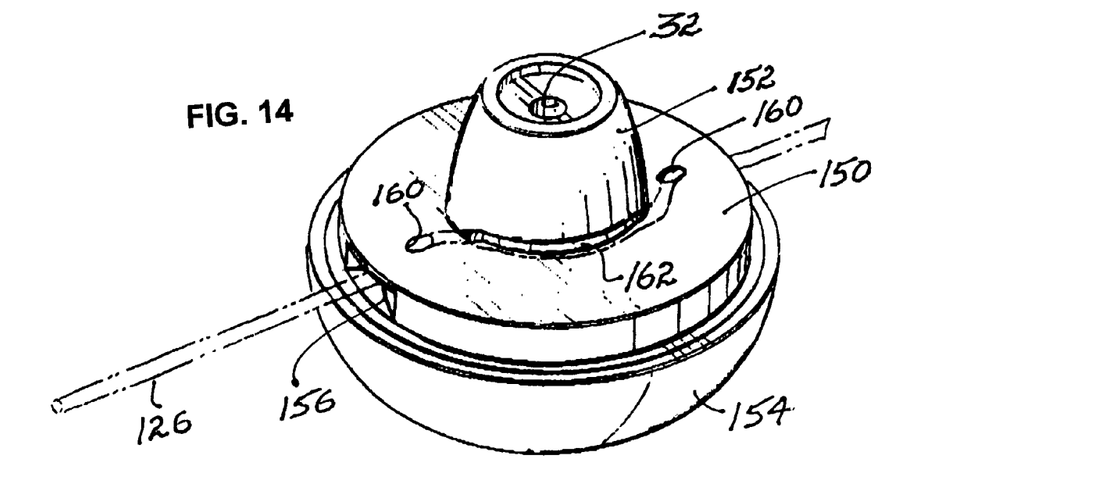
FIG. 14 is a top perspective view of another embodiment of the invention.

A final embodiment of the invention is illustrated in FIGS. 13 and 14, in two slightly different configurations. In this embodiment, the principles which are utilized in conjunction with the embodiments of FIGS. 9 through 12 also are employed. In the embodiment shown in FIG. 13, however, a top plate 150 has an upward hub 152 with the central opening 32 in it for attachment to the drive mechanism of a string trimmer machine, as described previously. A spacer plate 154, which may be similar to either of the types of spacer plates 22 or 114 described above, is employed, and operates in the same manner with the top portion 150/152, as described previously. A line 126 extends from an exit opening 156 on one side of the plate 152 and from an exit opening 156 on another side, much in the same manner as in the embodiments described in conjunction with FIGS. 9 through 12. An internal channel formed in any suitable manner (including, but not limited to, the techniques described specifically above in conjunction with FIGS. 1 through 4) is used to guide the line to a portion of the central hub where it exits and follows a curved path 158 around a portion of the circumference of the hub and then back to a channel on the other side and out through the exit opening 156. The path 158 performs a similar function as the holes 144 or 146 in the embodiment of FIG. 12, or the holes 121 or 123 in the embodiment of FIGS. 9 through 11. Clearly, a path similar to the path 158 could be formed on the other side of the central hub.

A variation of the embodiment shown in FIG. 13 is shown in FIG. 14. The structure of the embodiment of FIG. 14 is nearly identical to the one shown in FIG. 13, except that in inserting a line 126 into the embodiment of FIG. 14, the line is grasped at its center point and each end is inserted downwardly through an opening 160 (similar to the opening 24 of the embodiment of FIGS. 1 through 4) on opposite sides of the central hub 152. The two ends of the line then are drawn outwardly through the openings 156 to cause the bight in the line to follow a curved path 162 located around the base of the upstanding hub portion 152, where it meets the circular plate 150. The friction provided around the base of the hub 152, between the holes 160, functions to securely hold the line in place in the manner similar to that described above in conjunction with FIGS. 9 through 12. Also, another path similar to the path 162 could be formed on the other side of the hub.

The foregoing descriptions of various embodiments of applicant's invention are intended to be illustrative and not as limiting. Various changes and modifications will occur to those skilled in the art to perform substantially the same function, in substantially the same way, to achieve substantially the same result, without departing from the true scope of the invention as defined in the appended claims.

What is claimed is:

1. A top loading fixed length line trimmer head for string trimmer machines using line segments of predetermined length including in combination:

a central cylindrical hub having an upper end and a lower end and configured for attachment to a drive shaft of a string trimmer machine, the central hub further having a longitudinal axis and an offset shoulder thereon;

a circular flange attached to and extending outwardly from the lower end of the central hub, the flange having at least one trimmer line exit opening on the circumference thereof;

sets of line termination apertures of different sizes on the shoulder of the hub extending generally parallel to the longitudinal axis of the hub and axially offset from the trimmer line exit openings for insertion and termination of an end of a length of trimmer line therein; and a line guide means on the flange located between the at least one line exit opening and the line termination apertures to direct lengths of trimmer line from the line termination apertures to the at least one line exit opening.

2. The trimmer head according to claim 1 wherein the at least one trimmer line exit opening includes spaced exit openings located on the circular flange, and the sets of line termination apertures include at least two line termination apertures of different sizes associated with each of the line exit openings.

3. The trimmer head according to claim 2 wherein two diametrically opposed longitudinal flanges on the central hub extending generally parallel to the longitudinal axis of the central hub and, wherein the line termination apertures are located in the longitudinal flanges.

4. The trimmer head according to claim 3 wherein the line termination apertures extend through the longitudinal flanges.

* * * * *